United States Patent
Deischinger

(10) Patent No.: US 7,706,586 B2
(45) Date of Patent: Apr. 27, 2010

(54) REAL-TIME STRUCTURE SUPPRESSION IN ULTRASONICALLY SCANNED VOLUMES

(75) Inventor: Harald Deischinger, Frankenmarkt (AT)

(73) Assignee: General Electric Company, Schenectady, NY (US)

( * ) Notice: Subject to any disclaimer, the term of this patent is extended or adjusted under 35 U.S.C. 154(b) by 794 days.

(21) Appl. No.: 11/158,540

(22) Filed: Jun. 22, 2005

(65) Prior Publication Data

US 2006/0294061 A1    Dec. 28, 2006

(51) Int. Cl.
G06K 9/00 (2006.01)
A61B 8/00 (2006.01)

(52) U.S. Cl. .............. 382/128; 382/130; 382/100; 382/131; 382/162; 382/261; 600/440; 600/437; 600/454; 600/447; 600/458; 715/961; 367/7; 367/11; 367/138

(58) Field of Classification Search ............ 382/128, 382/131, 162, 261; 600/443, 454, 455, 437, 600/472, 447, 444, 458, 456, 441; 707/3; 367/7, 138; 73/624
See application file for complete search history.

(56) References Cited

U.S. PATENT DOCUMENTS

| | | | | |
|---|---|---|---|---|
| 5,269,309 A | * | 12/1993 | Fort et al. | 600/447 |
| 6,005,827 A | * | 12/1999 | Hossack et al. | 367/7 |
| 6,146,331 A | * | 11/2000 | Wong | 600/454 |
| 6,181,810 B1 | * | 1/2001 | Zhang et al. | 382/128 |
| 6,226,228 B1 | * | 5/2001 | Hossack et al. | 367/138 |
| 6,702,745 B1 | * | 3/2004 | Smythe | 600/443 |
| 6,997,876 B2 | * | 2/2006 | Mo et al. | 600/455 |
| 7,253,620 B1 | * | 8/2007 | Derbyshire et al. | 324/307 |
| 7,285,092 B2 | * | 10/2007 | Duric et al. | 600/443 |
| 7,492,947 B2 | * | 2/2009 | Nanbu | 382/209 |
| 2003/0085632 A1 | * | 5/2003 | Take et al. | 310/323.19 |
| 2003/0097068 A1 | * | 5/2003 | Hossack et al. | 600/443 |
| 2004/0213445 A1 | * | 10/2004 | Lee et al. | 382/128 |
| 2005/0049479 A1 | | 3/2005 | Brandl et al. | |
| 2005/0049494 A1 | | 3/2005 | Gritzky et al. | |
| 2005/0111710 A1 | | 5/2005 | Gritzky et al. | |
| 2005/0113689 A1 | * | 5/2005 | Gritzky | 600/437 |

OTHER PUBLICATIONS

GE Medical Systems, Voluson® 730Expert—Basic User Manual, Chapter 11, pp. 48-51, General Electric Kretztechnik GmbH & Co. OHG, 2004.

* cited by examiner

*Primary Examiner*—Wesley Tucker
*Assistant Examiner*—Nancy Bitar
(74) *Attorney, Agent, or Firm*—McAndrews, Held & Malloy, Ltd.; Peter J. Vogel; Michael A. Dellapenna

(57) ABSTRACT

Certain embodiments of the present invention include methods, systems, and computer readable media for real-time structure suppression in ultrasonically scanned volumes. A method includes receiving a plurality of datasets, each of said plurality of datasets representative of an ultrasonically scanned volume. The method further includes automatically applying in real-time a suppression filter to said plurality of datasets to form a plurality of filtered datasets, wherein at least two of said plurality of filtered datasets are sequenceable to form a data stream.

24 Claims, 7 Drawing Sheets

Prior Art

Prior Art

Prior Art

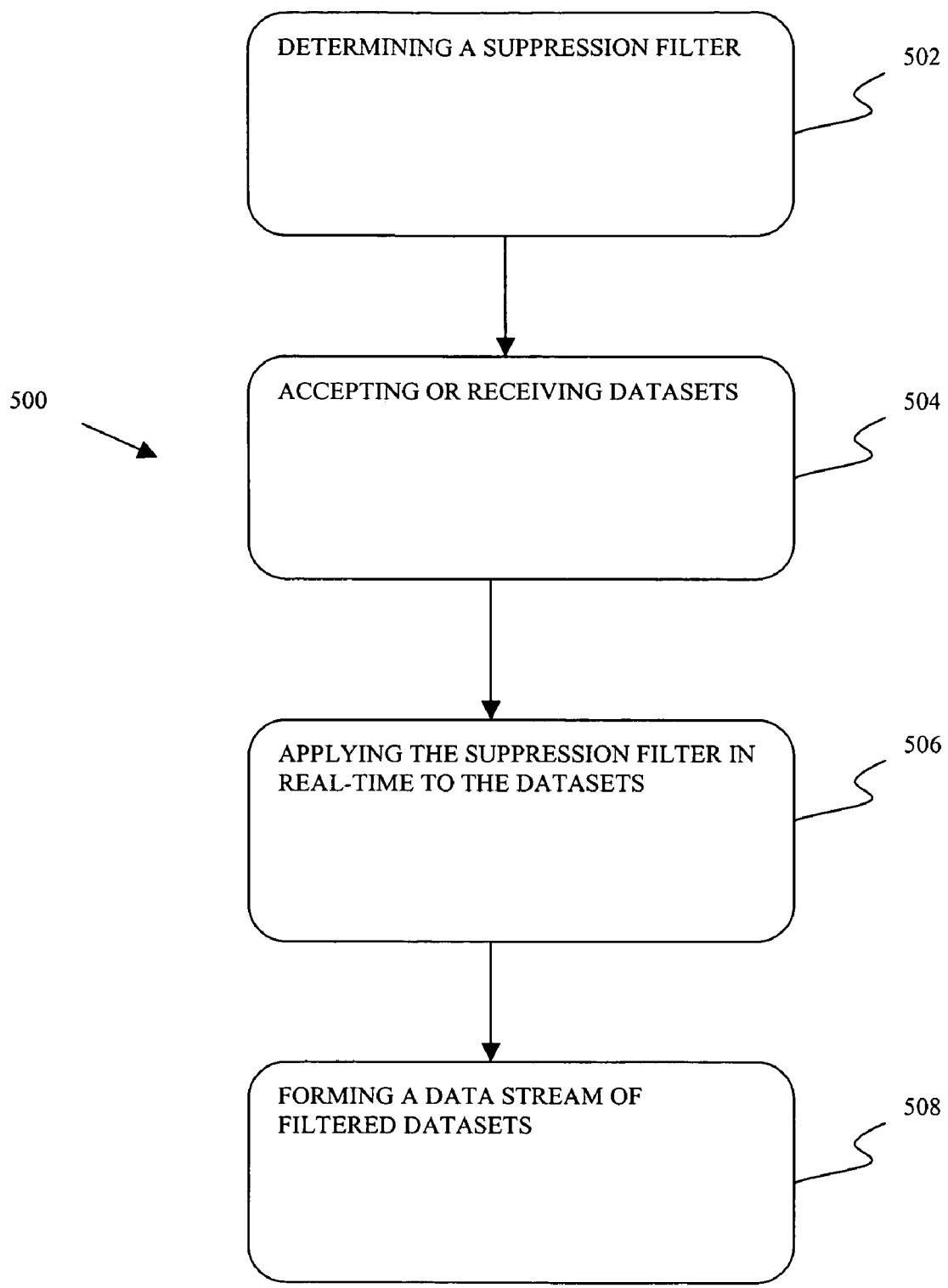

REAL-TIME STRUCTURE SUPPRESSION IN ULTRASONICALLY SCANNED VOLUMES

RELATED APPLICATIONS

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

The present application relates generally to ultrasonic imaging systems. In particular, the present application relates to methods and systems for suppressing structure in real-time across sequential scanned volumes.

Conventional ultrasonic systems are capable of acquiring data representative of a scanned volume, and processing and displaying the acquired data as an image. The acquired data may have three-dimensional ("3D") information corresponding to the scanned volume. Similarly, the image may appear 3D based on information in the acquired data. Over a period of time, an ultrasonic system may acquire a sequence of 3D datasets, which may be processed and displayed as a sequence of 3D images. Alternate names for a sequence of acquired 3D datasets or images include dynamic 3D data and four-dimensional ("4D") data. Conventional ultrasonic systems may also include a feature to suppress a portion of acquired data or images. For example, the Voluson 730 by General Electric allows a user to suppress a portion of a 3D scanned volume using the "MagiCut" feature. This feature is detailed extensively in the V730 Expert BT04 Basic User Manual, G.E Part Number KTI 105 927-100. MagiCut allows a user to suppress a volume by selecting an area from an ultrasonic image.

As described in V730 Expert BT04 Basic User Manual, six suppression methods are available with MagiCut. These different methods can be used in different cases depending on the user's goals. The first suppression method is "Inside Contour": With this suppression method the part of the image within the contour (drawn freehand) is suppressed. If a contour is left open, the program automatically closes the contour with a straight line from the ending point to the starting point. The second suppression method is "Outside Contour": All parts of the image that lie outside of the contour (drawn freehand) are suppressed. If a contour is left open, the program automatically closes the contour with a straight line from the ending point to the starting point. The third suppression method is "Inside Box": While holding down the right mouse button, move the mouse in a diagonal fashion from the beginning cut point to the end cut point in order to create a box. The part of the image inside the box is suppressed. The fourth suppression method is "Outside Box": Using the same way of drawing as with "Inside Box," draw a box. All parts of the image that lie outside the box are suppressed. The fifth and sixth suppression methods are "Small Eraser" and "Big Eraser": Hold down the right mouse button and move across the image. Any area touched by the mouse cursor will be suppressed. MagiCut also allows the user to define a cut depth, so that the entire volume depth may be suppressed, or only a portion of the volume depth may be suppressed. In addition to the methods of cutting available with MagiCut, various other image editing techniques are widely known to accomplish volume suppression.

FIG. 2 illustrates an example of 3D volume suppression. An unsuppressed 3D image 10 and a 3D image with volume suppression 12 are shown side-by-side. The unsuppressed image 10 shows legs of a fetus and additional tissue and matter. The image with volume suppression 12 includes the legs 14, and a suppressed volume 16. Note that a 3D image contains information corresponding to three dimensions, and thus appears three-dimensional, although it may be displayed on a substantially two-dimensional display.

FIG. 3 illustrates another example of 3D volume suppression. FIG. 3 shows two images 18, 20 side-by-side. For reference, a depth axis 19 is shown in each image 18, 20. On the left is an ultrasonic image with full-depth suppression 18. In this type of volume suppression, a selected area is suppressed through the full depth of the image. On the right is an ultrasonic image with partial-depth suppression 20. In partial-depth volume suppression, a selected area is suppressed to a depth that is less than the full depth of the image.

FIG. 1 illustrates a schematic block diagram of a conventional ultrasonic imaging system with 3D imaging and structure suppression. An ultrasonic imaging system 100 includes a transmitter 134 that drives a transducer 132. The transducer 132 emits ultrasonic signals into a volume of interest 130. Some of the emitted signals are backscattered from the volume of interest 130 to the transducer 132. A receiver 136 receives the backscattered signal. The backscattered signal may be representative of a portion of the volume of interest 130. The receiver 136 communicates with a memory 138 to store ultrasonically gathered data representative of the volume of interest 130. The ultrasonically gathered data may contain information corresponding to a variety of coordinate systems. For example, the data may contain information corresponding to a topical coordinate system. The transmitter 134, transducer 132, and receiver 136 may influence the coordinate mapping that corresponds to the ultrasonically gathered data.

It may be practical to convert the ultrasonically gathered data into a three-dimensional Cartesian coordinate system. To accomplish this conversion, the ultrasonically gathered data may be processed by a volume scan converter 140. The 3D dataset may be stored in memory 142. A suppression structure generator 146 retrieves the 3D dataset from memory 142. A user 144 interacts with a suppression structure generator 146. Using image editing techniques, the user 144 may select a structure for suppression with the suppression structure generator 146. The suppression structure generator 146 may store a 3D dataset with structure suppression in memory 142. The volume rendering processor 148 may then retrieve the dataset and transform the dataset into a viewable image. A video processor 150 and display 152 may display a viewable image to the user.

While conventional ultrasonic imaging systems conveniently facilitate volume suppression in a single 3D scanned image, it is much more difficult and time consuming to accomplish volume suppression in multiple 3D images or 4D images with such systems. One way to accomplish 4D suppression (i.e. suppression in a sequence of 3D volumes) is for a user to select a volume for suppression on a 3D scanned image, and to open a subsequent 3D image and repeat the process of selecting a volume for suppression. Such a procedure is memory intensive, time consuming, and inconvenient. Additionally, manual intervention on a frame-by-frame basis removes the possibility of providing real-time suppression of structure in 4D ultrasonic images.

Thus there is a need for methods and systems to suppress structure in 4D ultrasonic data without repeated user intervention. There is a need for methods and systems to suppress structure in 4D ultrasonic data in real-time. There is also a need to implement such systems and methods efficiently and inexpensively.

BRIEF SUMMARY OF THE INVENTION

According to an embodiment, a method for processing ultrasonic data comprises: receiving a plurality of receiving a plurality of datasets, each of said plurality of datasets representative of an ultrasonically scanned volume; and automatically applying in real-time a suppression filter to said plurality of datasets to form a plurality of filtered datasets, wherein at least two of said plurality of filtered datasets are sequenceable to form a data stream. In another embodiment, said suppression filter comprises a mask. In another embodiment, said mask comprises a matrix of data corresponding to locations in each of said datasets, at least some elements of said matrix of data having a suppression state of TRUE. In another embodiment, at lest one said location in at least one of said datasets is suppressed when corresponding element of said matrix of data has said suppression state of TRUE. In another embodiment, applying said suppression filter to said plurality of datasets further comprises ignoring a location in each of said datasets during recall of each of said datasets from a memory if corresponding element of said matrix of data has a suppression state of TRUE. In another embodiment, applying said suppression filter to said plurality of datasets further comprises altering at least a portion of data in each of said datasets during recall of each of said datasets from a memory if corresponding element of said matrix of data has a suppression state of TRUE. In another embodiment, said suppression filter is applied to between four (4) and fifty (50) datasets per second.

According to an embodiment, a system for processing ultrasonic data comprises: a memory capable storing data images from a memory, said data images representative of an ultrasonically scanned volume; and an image processor communicatively linked to said memory to receive said data images and to output a processed data stream for video processing, said data stream comprising a sequence of filtered data images, wherein said image processor applies a suppression filter to each of a plurality of said data images in real-time to form said sequence of filtered data images. In another embodiment, said suppression filter comprises a matrix of data corresponding to locations in each of said data images, at least some elements of said matrix of data having a suppression state of TRUE. In another embodiment, at lest one said location in at least one said data images is suppressed when corresponding element of said matrix of data has said suppression state of TRUE. In another embodiment, said image processor applies said suppression filter by ignoring a location in one of said data images during recall of said one of said data images from a memory if corresponding element of said matrix of data has said suppression state of TRUE. In another embodiment, said image processor comprises at least one of: a volume scan converter, and a volume rendering processor According to an embodiment, a computer-readable medium having a set of instructions for execution on a computer comprises: a suppression volume determination routine for determining a suppression volume; a dataset acceptance routine for accepting a plurality of scanned datasets, each of said plurality of scanned datasets representative of ultrasonically gathered information; and a suppression volume impartation routine for imparting said suppression volume to at least two of said plurality of scanned datasets in real-time to form a data stream. In another embodiment, said suppression volume comprises a matrix of data corresponding to locations in each of said scanned datasets, at least some elements of said matrix of data having a suppression state of TRUE. In another embodiment, at lest one said location in at least one said scanned dataset is suppressed when corresponding element of said matrix of data has said suppression state of TRUE. In another embodiment, said suppression volume impartation routine comprises a set of instructions for ignoring a location in one of said scanned datasets if a corresponding element of said matrix of data has said suppression state of TRUE. In another embodiment, said suppression volume impartation routine comprises a set of instructions for altering at least a portion of data corresponding to a location in one of said scanned datasets if a corresponding element of said matrix of data has said suppression state of TRUE. In another embodiment, said suppression volume impartation routine comprises a set of instructions for removing a subset of data from said plurality of scanned datasets to form a data stream. In another embodiment, said suppression volume determination routine comprises a set of instructions for receiving direction from a user to determine said suppression volume. In another embodiment, said data acceptance routine and said suppression volume impartation routines are capable of processing between four (4) and fifty (50) scanned datasets per second.

BRIEF DESCRIPTION OF SEVERAL VIEWS OF THE DRAWINGS

FIG. 7 illustrates a flow diagram in accordance with an embodiment of the present invention.

DETAILED DESCRIPTION OF THE INVENTION

Figure 1:
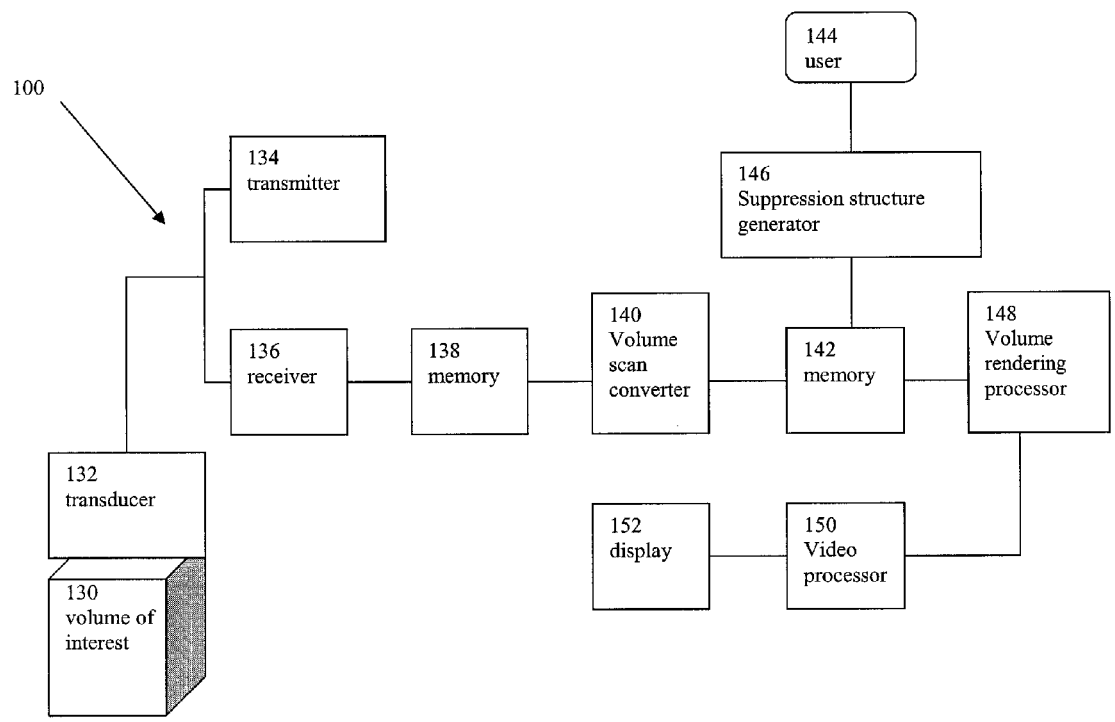
FIG. 1 illustrates a schematic block diagram of an ultrasonic imaging system with 3D imaging and structure suppression.
Figure 2:
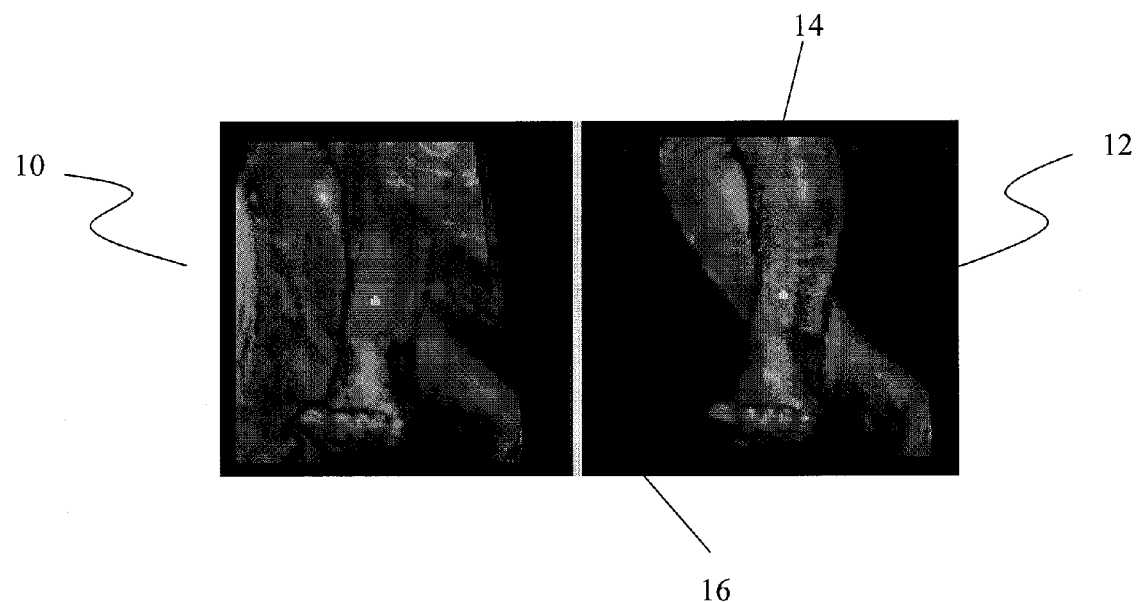
FIG. 2 illustrates an example of 3D volume suppression.
Figure 3:
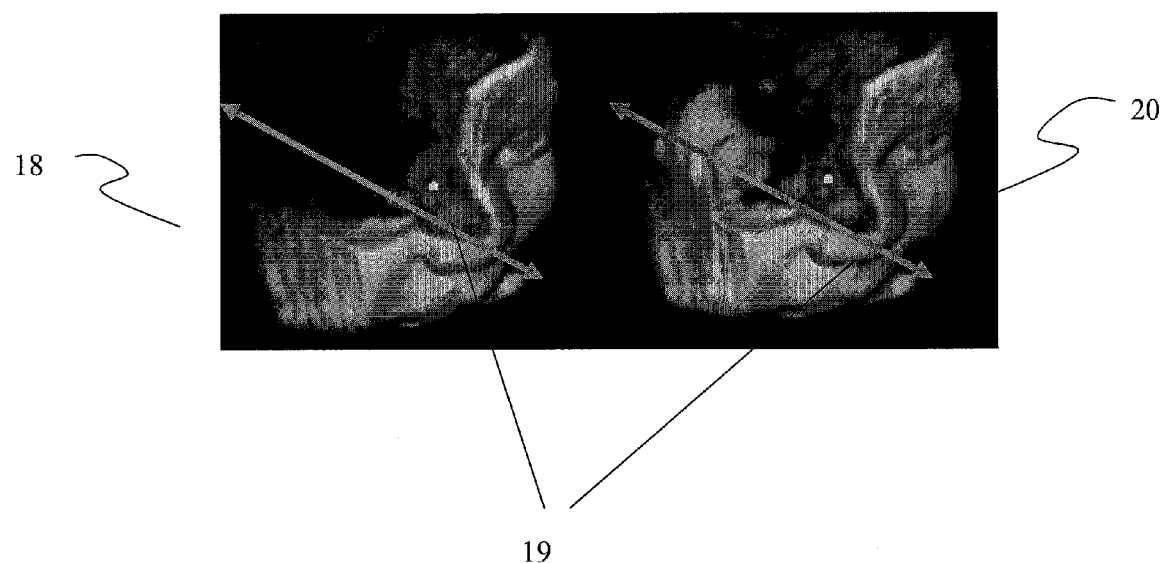
FIG. 3 illustrates an example of 3D volume suppression.
Figure 4:
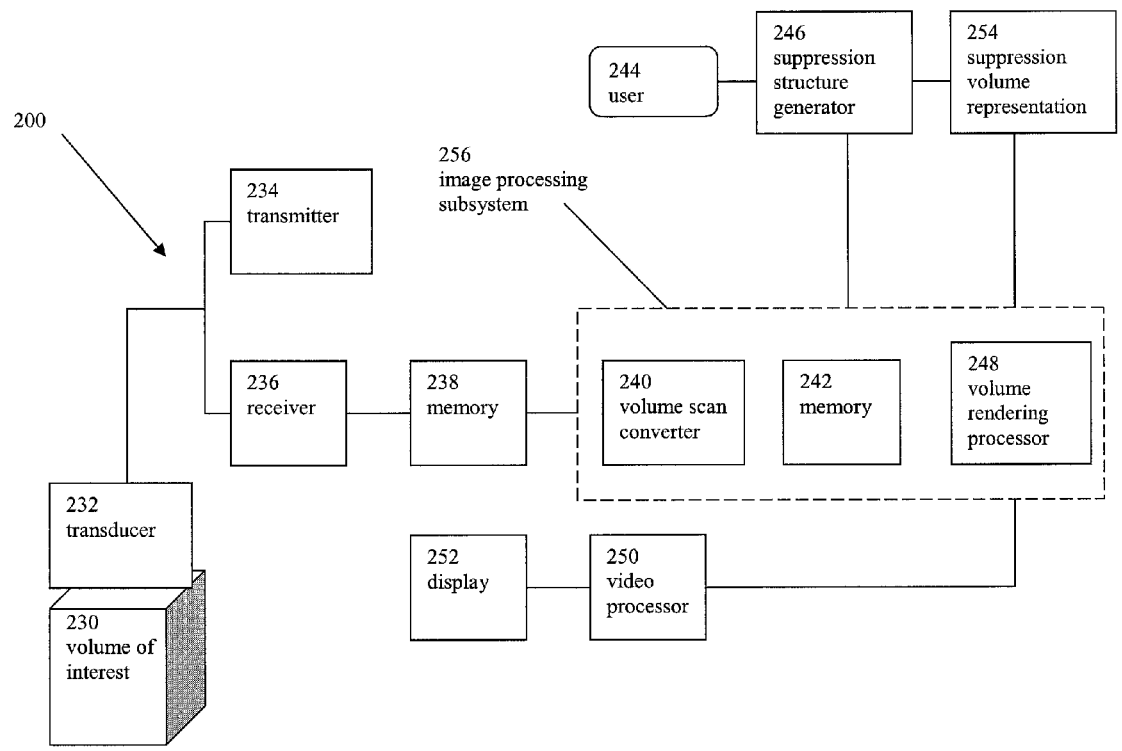
FIG. 4 illustrates a schematic block diagram of an ultrasonic imaging system in accordance with an embodiment of the present invention.

FIG. 4 illustrates a schematic block diagram of an ultrasonic imaging system 200 in accordance with an embodiment of the present invention. The components of the system 200 may be implemented separately and/or integrated in various forms. The components of the system 200 may be implemented in software, hardware, and/or firmware, for example. An ultrasonic imaging system 200 includes a transmitter 234 that drives a transducer 232. The transducer 232 emits ultrasonic signals into a volume of interest 230. Some of the emitted signals are backscattered from the volume of interest 230 to the transducer 232. A receiver 236 receives the backscattered signal. The backscattered signal may be representative of a portion of the volume of interest 230. The receiver 236 may communicate with a memory 238 to store ultrasonically gathered information representative of the volume of interest 230 being scanned. The dataset may be scanned and stored with reference to any of a variety of coordinate systems, such as a topical coordinate system.

An image processing subsystem 256 may communicate with the receiver 236 or memory 238 to retrieve ultrasonically scanned data representative of the volume of interest. The image processing subsystem 256 may comprise several components including a volume scan converter 240, a memory 242, and a volume rendering processor 248. The volume scan converter 240 and volume rendering processor 248 may be combined into one functional component. In an embodiment, the volume scan converter 240 may convert ultrasonically gathered data into a dataset that is referenced to a three-dimensional Cartesian coordinate system. The dataset may then be stored in a memory 242. A memory 242 is any device, or combination of devices suitable for short-term, or long-term storage of electronic data. The volume rendering processor 248 may then retrieve the dataset and transform the dataset into a viewable image. The 3D dataset may then be stored in memory 242.

A suppression structure generator 246 may retrieve a dataset from memory 242. The suppression structure generator 246 may render a displayable 3D image corresponding to the volume of interest 130. As another option, the suppression structure generator 246 may provide a predefined 3D image. A user 244 interacts with a suppression structure generator 246 through a user interface, such as a graphical user interface, keyboard, and mouse. The suppression structure generator 246 allows the user 244 to make structure suppression modifications to a displayed 3D image. Using image editing features detailed in the V730 Expert BT04 Basic User Manual, G.E Part Number KTI 105 927-100, or by using other well-known techniques, the user 244 may select a structure for suppression by interacting with the suppression structure generator 246.

After the user 244 selects a structure for suppression, the suppression structure generator 246 may generate a corresponding suppression volume representation 254. The suppression volume representation 254 contains information corresponding to a volume to be removed or suppressed from the scanned datasets. The volume to be removed or suppressed may be called a suppression volume. The image processing subsystem 256 may accept the suppression volume representation 254 as an input. In an embodiment, the volume rendering processor 248 portion of the image processing subsystem 256 accepts the suppression volume representation 254 as an input. In another embodiment the volume scan converter 240 portion of the image processing subsystem 256 accepts the suppression volume representation 254 as an input. In another embodiment, the suppression volume representation 254 may be stored in memory, and retrieved by the image processing subsystem 256 automatically. In addition to accepting the suppression volume representation 254 as an input, the image processing subsystem 256 may also receive or retrieve scanned datasets representative of the volume of interest 230. The scanned datasets may be received or retrieved from the memory 242 internal to the image processing subsystem 256. Alternatively, the scanned datasets may be received or retrieved from memory 238, or from the receiver 236.

The image processing subsystem 256 imparts a suppression volume corresponding to the suppression volume representation 254 to one or more scanned datasets. The image processing subsystem 256 may impart the suppression volume to the scanned datasets in a variety of ways. In one embodiment, a scanned dataset corresponding to the volume of interest 230 is received/retrieved, and data corresponding to the suppression volume is subsequently removed from the suppression volume. In another embodiment, the image processing subsystem 256 filters a scanned dataset with the suppression volume representation 254, such that a resulting filtered dataset has transparent or semi-transparent locations corresponding to the suppression volume. In another embodiment, the image processing subsystem 256 filters a scanned dataset with the suppression volume representation 254, such that a resulting filtered dataset has altered color information corresponding to the suppression volume. In another embodiment, the image processing subsystem 256 filters a scanned dataset with the suppression volume representation 254, such that a resulting filtered dataset has altered grayscale information corresponding to the suppression volume.

Figure 6:
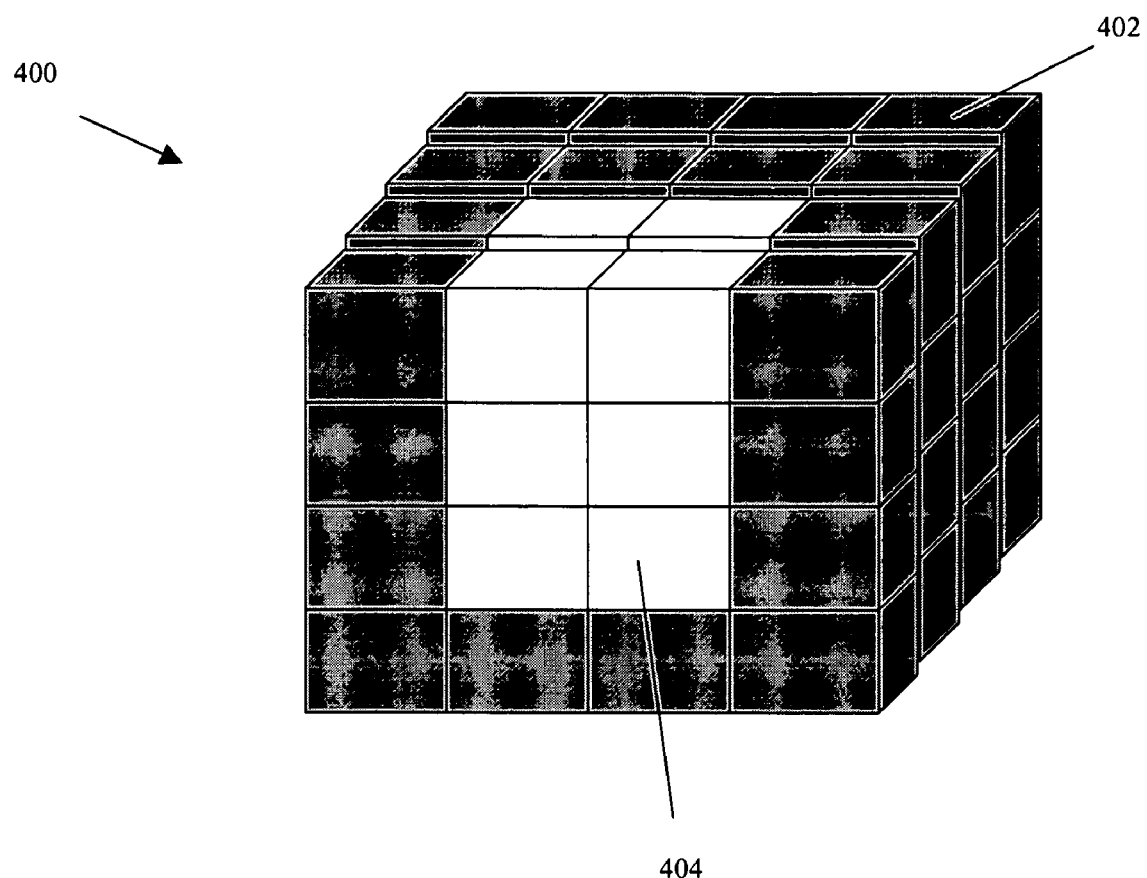
FIG. 6 illustrates a mask in accordance with an embodiment of the present invention.

In another embodiment, the suppression volume representation 254 may be a mask. FIG. 6 illustrates a mask 400 in accordance with an embodiment of the present invention. The mask 400 is a 3D matrix. In an embodiment, each matrix element comprises data that is indicative of a suppression state. A matrix element may indicate a TRUE suppression state 404, or a FALSE suppression state 402. As used in this application, a matrix element with a TRUE suppression state 404 indicates that a corresponding location in a scanned dataset is to be suppressed. Conversely, a matrix element with a FALSE suppression state 402 indicates that a corresponding location in a dataset is not to be suppressed. A matrix of binary data elements is one way to indicate TRUE and FALSE suppression states in a mask.

In another embodiment, a mask 400 comprises a plurality of matrices. This may be useful when working with vector data, or with color data, such as power Doppler data, and velocity Doppler data. In this configuration, each of the plurality of matrices in the mask 400 corresponds to a different aspect of the data type in the scanned dataset. In this manner, volume suppression may be accomplished with more complicated data types. Similarly, in another embodiment, a mask 400 comprises a matrix with a plurality of values corresponding to each element. Each of the plurality of values in each element may correspond to a different aspect of a data type in a scanned dataset. Thus a TRUE suppression state 404 may include a variety of different information. A variety of sub-types of TRUE suppression states 404 may exist. TRUE suppression state 404 may include, for example, a state that indicates data should be made transparent or semi-transparent, a state that indicates data should be altered, or a state that indicates that data is to be ignored.

Turning back to FIG. 4, in an embodiment, the image processing subsystem 256 may employ a mask to impart a suppression volume to scanned datasets. The image processing subsystem 256 checks the suppression state of a given element in a mask matrix. If the matrix element has suppression state that is FALSE, then the image processing subsystem 256 retrieves the corresponding location or pixel from a scanned 3D dataset. For example, the corresponding location or pixel may be retrieved from memory 242 when a given mask element suppression state is FALSE 402. If the matrix element suppression state is TRUE 404, then the image processing subsystem 256 may not retrieve the corresponding scanned data pixel or location. Instead, the image processing subsystem 256 may insert a null value, or a value representative of suppressed structure. In this manner of filtering, the ultrasonic imaging system 200 will not waste time retrieving scanned data that is to be suppressed. Alternatively, if the matrix element suppression state is TRUE 404, then the image processing subsystem 256 may only retrieve a portion of the corresponding data pixel or location. As another alternative, if the matrix element suppression state is TRUE 404, then the image processing subsystem 256 may retrieve and alter the corresponding data pixel or location. As yet another alternative, if the matrix element suppression state is TRUE 404, then the image processing subsystem 256 may retrieve and alter a portion or aspect of the corresponding data pixel or location.

After imparting a suppression volume to a scanned dataset, the image processing subsystem 256 communicates with a video processor 250. A video processor 250 and display 252 may transform a filtered or suppressed dataset into a viewable image. The video processor 250 and display 252 may be used to generate viewable images for use with the suppression structure generator 246. Additionally, the video processor 250 and display may be used to create viewable images that correspond to scanned datasets with suppressed structure and scanned datasets without suppressed structure.

Figure 5:
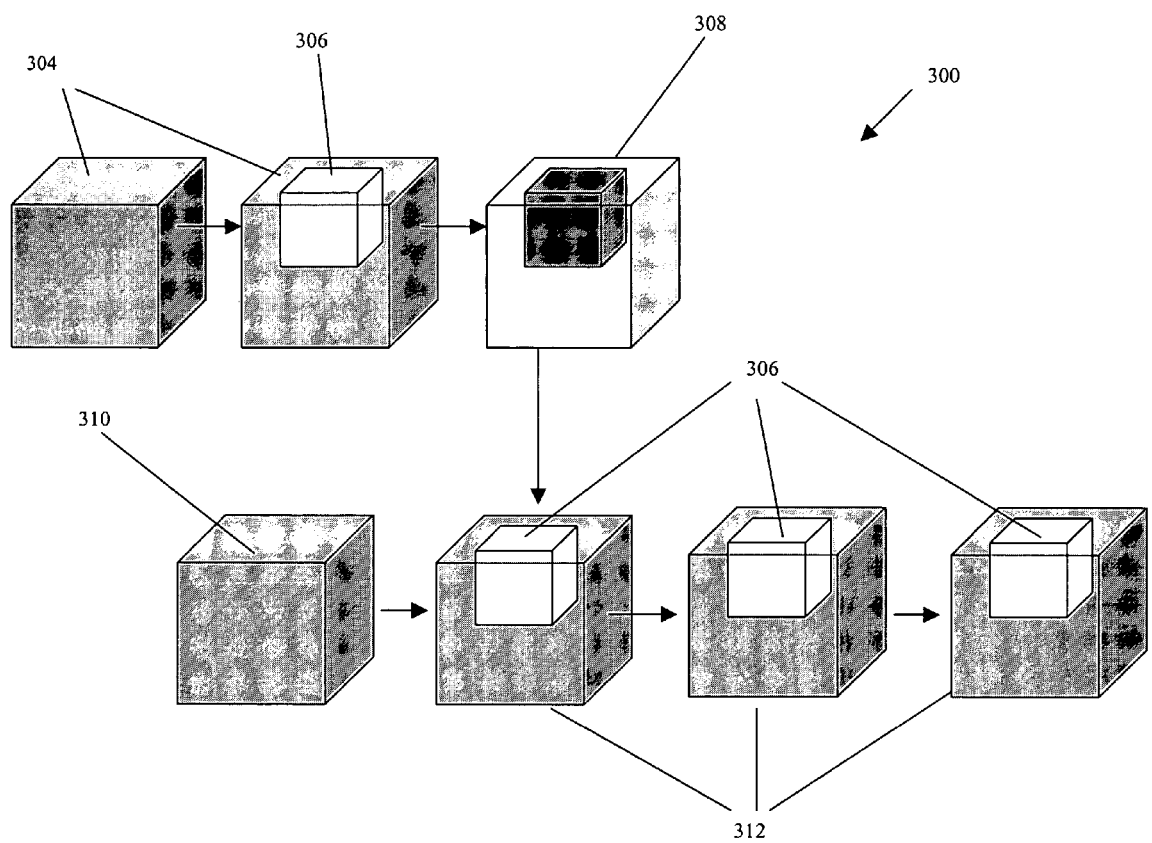
FIG. 5 illustrates a block diagram of structure suppression in sequential scanned datasets in accordance with an embodiment of the present invention.

Once the image processing subsystem 256 has obtained a suppression volume representation 254, a succession of scanned datasets may be processed to suppress the corresponding suppression volume. FIG. 5 illustrates a block diagram 300 of structure suppression in sequential scanned datasets in accordance with an embodiment of the present invention. A user 244 may edit a 3D image or dataset 304 to determine a suppression volume 306. The suppression volume 306 corresponds to structure that is to be suppressed. The structure suppression generator 246 generates a suppression volume representation 308 corresponding to the suppression volume 306. A scanned dataset 310 contains information corresponding to the volume of interest 130. The suppression volume representation 308 is used to impart a suppression volume into the scanned dataset 310. The result is a filtered data image or dataset 312 that has suppressed structure that corresponds to the suppression volume 306.

As successive scanned datasets 310 are queued in, the suppression volume 306 is imparted to each scanned dataset 310 to form a sequence of filtered data images or datasets 312. In this manner, structure may be suppressed in a sequence of scanned datasets 310 without bogging down the process by over-accessing memory storage devices and image filtering algorithms. The process of suppressing structure in a sequence of 3D images may occur in real-time. By real-time, it is understood that a user will not perceive substantially noticeable delay between scanning and image display. A bottleneck in the ultrasonic imaging system 200 may arise during structure suppression. Generally, the suppression volume 306 may be imparted to scanned datasets 310 at a rate of four (4) to fifty (50) datasets per second. If the rate is slower than four (4) datasets per second, a viewer will perceive discontinuity in a video sequence of filtered data images 312. However, it is possible to build systems that operate at a rate slower than 4 Hz. Fifty is chosen as a practical top-speed filtering rate, because the human eye cannot detect variations faster than 50 Hertz. However, it is possible to build systems that operate faster than 50 Hz.

FIG. 7 illustrates a flow diagram 500 in accordance with an embodiment of the present invention. At step 502, a suppression filter is determined. In an embodiment, the structure suppression generator 246 facilitates the determination of a suppression filter. A user 244 may interact with the structure suppression generator 246. For example, V730 Expert BT04 Basic User Manual details the MagiCut feature, which describes how a user may select a structure for suppression. A user 244 may, for example, select a contour on an ultrasonic image, and select a partial suppression depth. In one suppression mode, everything inside the contour may be suppressed up to the selected partial suppression depth. The structure suppression generator 246 may then determine a suppression filter based on user 244 interaction. The suppression filter may be a mask 400 as shown in FIG. 6. As discussed above, the mask 400 may include a 3D matrix. In an embodiment, each matrix element comprises data that is indicative of a suppression state. A matrix element may indicate a TRUE suppression state 404, or a FALSE suppression state 402. As used in this application, a matrix element with a TRUE suppression state 404 indicates that a corresponding location in a scanned dataset is to be suppressed. Conversely, a matrix element with a FALSE suppression state 402 indicates that a corresponding location in a dataset is not to be suppressed.

Turning back to FIG. 7, at step 504, datasets may be accepted or retrieved. The datasets may contain information representative of an ultrasonically scanned image. The datasets may contain information corresponding to a back-scattered signal from a volume of interest 230. The datasets may be stored in a memory before being retrieved at step 504. In an embodiment, a sequence of datasets represent a 4D image, and each dataset is retrieved one at a time. At step 506, the suppression filter is applied in real-time to each dataset. The application of the suppression filter may result in the suppression of data at a location of a dataset when the corresponding element of the suppression filter matrix that has a suppression state of TRUE. In an embodiment, the suppression filter is applied by ignoring a location corresponding to a matrix element with a suppression state of TRUE. For example, if a dataset is being recalled from memory, the suppression filter may be applied by not recalling data locations that correspond to matrix elements with a suppression state of TRUE. In another embodiment, the suppression filter may be applied by altering a portion of data in a dataset corresponding to matrix elements with a suppression state of TRUE. The suppression filter may be applied in real-time. In an embodiment, the suppression filter is applied to between 4 and 50 datasets per second. At step 508, a data stream of datasets including the suppression volume is formed. In an embodiment, each 3D scanned dataset may be processed in a sequential manner to form the data stream. Correspondingly, each 3D scanned dataset may be output in a similar sequential manner each 3D filtered dataset. The sequence of 3D filtered datasets forms a data stream including a real-time suppression of a suppression volume. The data stream may be processed and played as a video, film loop, animation, or the like.

Thus, certain embodiments provide methods and systems to suppress structure in 4D ultrasonic volumes without repeated user intervention. Certain embodiments provide methods and systems to suppress structure in 4D ultrasonic volumes in real-time. Certain embodiments provide efficient and inexpensive implementations of such systems and methods.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, features may be implemented with software, hardware, or a mix thereof. Therefore, it is intended that the invention not be limited to the particular embodiment disclosed, but that the invention will include all embodiments falling within the scope of the appended claims.

What is claimed is:

1. A method for processing ultrasonic data, the method comprising:

using a processor to implement a suppression structure generator;

displaying a first image by said suppression structure generator, said first image being three-dimensional;

allowing a user to interact with said first three-dimensional image to form a suppression structure, said suppression structure being three-dimensional;

generating, by said suppression structure generator, a suppression volume representation from said suppression structure, said suppression volume representation being three-dimensional;

receiving a plurality of datasets, said datasets being three-dimensional, and said datasets being representative of an ultrasonically scanned volume; and automatically applying in real-time said suppression volume representation to remove a suppression volume from each of said plurality of datasets to form a plurality of filtered datasets, wherein at least two of said plurality of filtered datasets are sequenceable to form a data stream, said data stream being four-dimensional.

2. The method of claim 1, wherein said suppression volume representation comprises a mask.

3. The method of claim 2, wherein said mask comprises a matrix of data corresponding to locations in each of said datasets, at least some elements of said matrix of data having a suppression state of TRUE.

4. The method of claim 3, wherein at least one of said locations in at least one of said datasets is suppressed when corresponding element of said matrix of data has said suppression state of TRUE.

5. The method of claim 3, wherein applying said suppression volume representation to each of said plurality of datasets further comprises ignoring a location in each of said datasets during recall of each of said datasets from a memory if corresponding element of said matrix of data has a suppression state of TRUE.

6. The method of claim 3, wherein applying said suppression volume representation to each of said plurality of datasets further comprises altering at least a portion of data in each of said datasets during recall of each of said datasets from a memory if corresponding element of said matrix of data has a suppression state of TRUE.

7. The method of claim 1, wherein said suppression volume representation is applied to between four (4) and fifty (50) datasets per second.

8. A system for processing ultrasonic data, the system comprising:
a memory configured to store data images from a memory, said data images being three-dimensional and said data images representative of an ultrasonically scanned volume;
a suppression structure generator configured to:
display a first three-dimensional image;
allow a user to interact with said first three-dimensional image to form a suppression structure filter in response to at least one user interaction, said suppression structure filter being three-dimensional; and
form a suppression volume representation from said suppression structure; and
an image processor communicatively linked to said memory to receive said data images and to output a processed data stream for video processing, said data stream comprising a sequence of filtered data images, wherein said image processor applies said suppression volume representation to each of a plurality of said data images in real-time to form said sequence of filtered data images, said sequence of filtered data images being four-dimensional.

9. The system of claim 8, wherein said suppression volume representation comprises a matrix of data corresponding to locations in each of said data images, at least some elements of said matrix of data having a suppression state of TRUE.

10. The system of claim 9, wherein at least one of said locations in at least one said data images is suppressed when a corresponding element of said matrix of data has said suppression state of TRUE.

11. The system of claim 9, wherein said image processor applies said suppression volume representation by ignoring a location in one of said data images during recall of said one of said data images from a memory if a corresponding element of said matrix of data has said suppression state of TRUE.

12. The system of claim 9, wherein said image processor comprises at least one of a volume scan converter or a volume rendering processor.

13. A non-transient computer-readable medium having a set of instructions for execution on a computer, said set of instructions comprising:
a suppression volume determination routine for determining a suppression volume representation in response to a user interacting with a first three dimensional image to form a suppression structure;
a dataset acceptance routine for accepting a plurality of scanned datasets, each of said plurality of scanned datasets being three-dimensional and representative of ultrasonically gathered information; and
a suppression volume impartation routine for imparting said suppression volume representation to at least two of said plurality of scanned datasets in real-time to form a data stream, said data stream being four-dimensional.

14. The computer-readable medium of claim 13, wherein said suppression volume representation comprises a matrix of data corresponding to locations in each of said scanned datasets, at least some elements of said matrix of data having a suppression state of TRUE.

15. The computer-readable medium of claim 14, wherein at lest one said location in at least one said scanned dataset is suppressed when corresponding element of said matrix of data has said suppression state of TRUE.

16. The computer-readable medium of claim 14, wherein said suppression volume impartation routine comprises a set of instructions for ignoring a location in one of said scanned datasets if a corresponding element of said matrix of data has said suppression state of TRUE.

17. The computer-readable medium of claim 14, wherein said suppression volume impartation routine comprises a set of instructions for altering at least a portion of data corresponding to a location in one of said scanned datasets if a corresponding element of said matrix of data has said suppression state of TRUE.

18. The computer-readable medium of claim 13, wherein said suppression volume impartation routine comprises a set of instructions for removing a subset of data from said plurality of scanned datasets to form a data stream.

19. The computer-readable medium of claim 13, wherein said suppression volume determination routine comprises a set of instructions for receiving direction from a user to determine said suppression volume.

20. The computer-readable medium of claim 13, wherein said data acceptance routine and said suppression volume impartation routine are capable of processing between four (4) and fifty (50) scanned datasets per second.

21. The method of claim 1, wherein said suppression structure is formed by allowing said user to perform a task, said task comprising selecting at least one of an inside contour, an outside contour, an inside box, an outside box, a big eraser, or a small eraser.

22. The method of claim 1, wherein said first three-dimensional image comprises a predefined three-dimensional structure.

23. The system of claim 8, wherein said suppression structure is formed by allowing said user to perform a task, said task comprising selecting at least one of an inside contour, an outside contour, an inside box, an outside box, a big eraser, or a small eraser.

24. The system of claim 8, wherein said first three-dimensional image comprises a predefined three-dimensional structure.

\* \* \* \* \*